(12) United States Patent
Hikita

(10) Patent No.: US 8,386,291 B2
(45) Date of Patent: Feb. 26, 2013

(54) EQUIPMENT PLANNING SUPPORT SYSTEM FOR TRIPLE-DECK ELEVATOR

(75) Inventor: Shiro Hikita, Tokyo (JP)

(73) Assignee: Mitsubishi Denki Kabushiki Kaisha, Chiyoda-Ku, Tokyo (JP)

(*) Notice: Subject to any disclaimer, the term of this patent is extended or adjusted under 35 U.S.C. 154(b) by 1362 days.

(21) Appl. No.: 11/659,696

(22) PCT Filed: Mar. 3, 2005

(86) PCT No.: PCT/JP2005/003623
§ 371 (c)(1),
(2), (4) Date: Aug. 7, 2007

(87) PCT Pub. No.: WO2006/092865
PCT Pub. Date: Sep. 8, 2006

(65) Prior Publication Data
US 2008/0221938 A1 Sep. 11, 2008

(51) Int. Cl.
*G06Q 10/00* (2006.01)
(52) U.S. Cl. ....... 705/7.25; 187/382; 187/385; 187/386; 187/387; 187/249; 705/7.11
(58) Field of Classification Search ............ 705/7, 7.11, 705/7.25; 187/249, 382, 385, 386, 387
See application file for complete search history.

(56) References Cited

U.S. PATENT DOCUMENTS

| | | | | |
|---|---|---|---|---|
| 4,993,518 | A | * | 2/1991 | van Straaten et al. ........ 187/387 |
| 5,612,519 | A | * | 3/1997 | Chenais ........................ 187/382 |
| 2002/0019759 | A1 | * | 2/2002 | Arunapuram et al. ............ 705/7 |
| 2004/0089504 | A1 | * | 5/2004 | Kostka ........................... 187/393 |
| 2008/0221938 | A1 | * | 9/2008 | Hikita .............................. 705/7 |

FOREIGN PATENT DOCUMENTS

| | | |
|---|---|---|
| JP | 3-288777 | 12/1991 |
| JP | 7-315708 | 12/1995 |
| JP | 9-295772 | 11/1997 |
| JP | 09295772 A | 11/1997 |
| JP | 2004-75308 | 3/2004 |
| JP | 2004075308 A | 3/2004 |
| JP | 2004-277177 | 10/2004 |

OTHER PUBLICATIONS

Elevator Planning andAnalysis on the Web—By Bruce A. Powell, The Bruce Powell Company, Inc. Jun. 2002—Elevator World 73.*
Korean Intellectual Property Office Notification of Opinion Submission in Application No. 10-2007-7002849 dated Nov. 18, 2008, and an English Translation thereof.
Gregory T. Kavounas, "Elevatoring Analysis With Double Deck Elevators", Elevator World, Nov. 1989, pp. 1-5.
European Search Report, issued in corresponding European Patent Appln. No. 05719927.5, dated Oct. 8, 2012.

* cited by examiner

*Primary Examiner* — Andre Boyce
*Assistant Examiner* — Ernest A Jackson
(74) *Attorney, Agent, or Firm* — Buchanan Ingersoll & Rooney PC

(57) ABSTRACT

The invention relates to a triple-deck elevator equipment planning support system, arranged such that the average number of times of being stopped per going-round is calculated on the basis of a given building specification and cage specification data in a triple-deck elevator system; a total value of getting-on/off time periods of passengers, a total value of door-opening/closing time periods, and the total value of running time periods are calculated based on the average number; and a going-round time period of an elevator is calculated from these calculation results, and a practical transportation capacity per on triple-deck elevator is calculated.

3 Claims, 2 Drawing Sheets

EQUIPMENT PLANNING SUPPORT SYSTEM FOR TRIPLE-DECK ELEVATOR

TECHNICAL FIELD

The present invention relates to an equipment planning support system for a triple-deck elevator and, more particularly, to an equipment planning support system capable of proposing a suitable elevator equipment draft by the calculation of a practical transportation capacity.

BACKGROUND ART

In normally selecting elevator equipment (the number of elevators, velocity, and capacity), a calculation method referred to as "traffic calculation" is adopted. This is a method of calculating the number of passengers capable of being transported in a unit time (normally 5 minutes) with this elevator when specified building specification and cage specification (e.g., velocity and capacity) are given. The procedure of comparing this calculation result and the building resident population, and of determining the required number of elevators, is generally adopted. (For example, refer to the Japanese Patent Publication (unexamined) No. 75308/2004 (Patent Document 1))

Furthermore, in non-Patent Document 1, a calculation expression, in which this traffic calculation is extended to a double-deck elevator, is reported.

First, prior to description of the invention, the schematic procedure of traffic calculation to be applied in the case of a normal elevator system (SD) described in Patent Document 1 is described.

Normally, the traffic calculation is performed on the assumption that all passengers get on from the reference floor (1F), and do not get on from the other floor, for example, in the case of an office building when cage and building specifications such as cage velocity and acceleration, capacity (number of passengers), door-opening/closing time period, the number of building stories, the number of service floors, and story height, are given. This calculation is made for the purpose of obtaining the number of elevators capable of transporting a large number of passengers that are generated at the time of office-going hour (UP Peak) of the building.

First of all, a predicted number of being stopped S of the cage after it has started from the reference floor toward upper floors until it is moved back, and an average number of being moved back of the cage are calculated. Herein, a building of (N+1) stories in which the reference floor is the lowermost floor is supposed.

[Expression 1]

$$S = N\left\{1 - \left(1 - \frac{1}{N}\right)^P\right\} \quad (1)$$

[Expression 2]

$$H = N - \sum_{i=1}^{N-1} \left(\frac{i}{N}\right)^P \quad (2)$$

Where: S indicates the predicted number of being stopped, N indicates the number of service floors except for the reference floor, P indicates the number of passengers in the cage at the time of starting from the reference floor, and H indicates the average highlighted floor.

Next, on the basis of the above-mentioned Expressions (1) and (2), the total value of getting-on/off time periods of passengers, the total value of door-opening/closing time periods, and the total value of running time periods will be obtained as follows.

[Expression 3]

Total value of getting-on time periods = $P \times t_{on}$, total value of getting-off time periods = $P \times t_{off}$, total value of door-opening/closing time periods = $(S+1)(t_o+t_c)$ total value of running time periods = $(S+1)(t_f(1)-t_v(1))+2H \times t_v(1)$ (3)

Where: $t_{on}$ is a getting-on time period per person, $t_{off}$ is a getting-off time period per person, $t_o$ is a door-opening time period, $t_c$ is a door-closing time period, $t_f(1)$ is a running time period per floor, and $t_v(1)$ is a passing time period per floor.

When calculating each value as described above, one going-round time period RTT will be calculated with the following expression as the total sum of these values.

[Expression 4]

$$RTT = P(t_{on}+t_{off})+(S+1)(t_o+t_c+t_f(1)-t_v(1))+H/2 \times t_v(1) \quad (4)$$

Furthermore, with this value, the transportation capacity per unit time HC of one elevator (the number of passengers capable of being transported per unit time) will be obtained with the following expression.

[Expression 5]

$$HC = 300P/RTT \quad (5)$$

From the expressions of traffic calculation as described above, on the supposition of, for example, HC=50 persons/5 minutes, that is, 300/50=6, thus the required number of elevators will be calculated to be 6.

In addition, now expressions of the traffic calculation of DD described in the above-mentioned non-Patent Document 1 is described. Herein, the operation in which the lower cage of DD is stopped only at the odd-numbered floor, and the upper cage thereof is stopped only at the even-numbered floor is assumed; and a building of 2(N+1) stories is supposed.

[Expression 6]

predicted number of DD being stopped (6)

$$S_d = N\left\{1 - \left(1 - \frac{1}{N}\right)^{2P}\right\} = 2S - \frac{S^2}{N}$$

total value of getting-on time periods = $P \times t_{on}$, total value of getting-off time periods = $P(2-S/N)t_{off}$, total value of door-opening/closing time periods = $(S_d+1)(t_o+t_c)$ total value of running time periods = $(S_d+1)(t_f(2)-t_v(2))+2H \times t_v(2)$, $t_f(2)$: running time period per two floors, and
$t_v(2)$: passing time period per two floors.

When calculating each value as described above, one going-round time period $RTT_{DD}$ of DD will be calculated with the following expression as the total sum of these values.

[Expression 7]

$$RTT_{DD}=Pt_{on}+P(2-S/N)t_{off}+(S(2-S/N)+1)(t_o+t_c+t_f(2)-t_v(2))+H \times t_v(2) \qquad (7)$$

Furthermore, with this value, the transportation capacity per unit time $HC_{DD}$ of one DD (the number of passengers capable of being transported in unit time) will be obtained with the following expression.

[Expression 8]

$$HC_{DD}=300 \times 2P/RTT \qquad (8)$$

patent Document 1: the Japanese Patent Publication (unexamined) No. 75308/2004
Non-Patent Document 1: G. T. Kavounas: Elevatoring Analysis with Double-deck Elevators, Elevator World, November, pp. 65-72 (1989)

DISCLOSURE OF INVENTION

However, the calculation method of the above-mentioned Patent Document 2 shows expressions of calculation to be strictly applied to a double-deck elevator (hereinafter referred to as DD), and cannot be applied to a triple-deck elevator (hereinafter, referred to as TD).

In the case of putting this TD in a practical building service, although the traffic calculation and the equipment planning method based thereon as in the case of a normal single deck elevator (hereinafter, referred to as SD) or DD are required, they have not been proposed.

The present invention was made in view of the above-mentioned requirement, and has an object of providing an equipment planning support system for a triple-deck elevator as a tool with which the traffic calculation and the equipment planning based thereon can be carried out in the same manner as in the case of SD or DD.

A triple-deck elevator equipment planning support system according to the invention comprises transportation capacity calculation means that includes: average stop number calculation means for calculating the average number of times of being stopped per going-round on the basis of a given building specification and cage specification data; getting-on/off time calculation means for calculating a total value of getting-on/off time periods of passengers based on the calculation result of mentioned average stop number calculation means; door-opening/closing time calculation means for likewise calculating a total value of door-opening/closing time periods; running time calculation means for calculating the total value of running time periods; going-round time calculation means for calculating a going-round time period of the elevator from the calculation result of each of these means; and practical transportation capacity calculation means for calculating a practical transportation capacity per triple-deck elevator based on the calculation result of mentioned going-round time calculation means.

As described above, according to the invention, on the basis of a given building specification and cage specification data, the average number of times of being stopped per going-round is calculated; the total value of getting-on/off time periods of passengers is calculated; the total value of door-opening/closing time periods and the total value of running time periods are likewise calculated; a going-round time period of an elevator is calculated from these calculation results; and a practical transportation capacity per on triple-deck elevator is calculated. As a result, an advantage exists in that it is possible to make the calculation of a transportation capacity regarding the triple-deck elevator system, and to carry out the equipment planning based thereon that cannot be conventionally achieved.

BEST MODE FOR CARRYING OUT THE INVENTION

Embodiment 1

Hereinafter, a preferred embodiment according to the present invention is described.

First, expressions of the traffic calculation of TD according to the invention are hereinafter described referring to FIGS. 1 through 3. Herein, in the case of TD, assumed is an operation in which the lowermost cage is stopped only at the floor of 3 m+1, the middle cage is stopped only at the floor of 3 m+2, and the uppermost cage is stopped only at the floor of 3 m+3. Further, the building of 3(N+1) stories is supposed.

FIG. 1 is a diagram for explaining a part of the concept of traffic calculation of TD.

FIG. 1(a) is a diagram showing TD formed of three cages of P1, P2, and P3. FIG. 1(b) is a diagram for explaining the probability of being stopped in order for each passenger of P1, P2, and P3 to get off TD.

For example, alphabet a in FIG. 1(b) shows the case in which TD is stopped in order for any passenger of P1, P2, and P3 to get off TD; alphabet b shows the case in which although no passenger of P3 gets off TD, the passengers of P1 and P2 get off TD; and alphabet e shows the case in which only the passenger of P1 gets off TD.

Herein, since a building of 3(N+1) stories is supposed, the service floor for each cage of P1, P2, and P3 itself to be capable of being stopped except for the reference floor is N numbers of floors respectively.

Thus, the probability of, for example, P1 of being stopped at a certain floor will be S/N with Expression 1. This probability is the same as in the cases of P2 and P3. Therefore, in the same manner as in the case of a, the probability of being stopped in order for any passenger of P1, P2, and P3 to get out is $(S/N)^3$.

Accordingly, the predicted number of times $S_a$ of being stopped in the case of a is $S_a=N(S/N)^3$.

Likewise, the predicted number of times $S_b$ of being stopped in the case of b is $S_b=N\{(S/N)^2-(S/N)3\}$.

Further, the predicted number of times $S_e$ of being stopped in the case of e is $S_e=N\{(S/N)-2(S/N)^2+(S/N)^3\}$.

The predicted number of times $S_t$ of being stopped including all the cases is $St=s_a+3S_b+3S_e$, so that will be obtained with the following expression.

[Expression 9]

$$S_t = 3S - \frac{3S^2}{N} + \frac{S^3}{N^2} \qquad (9)$$

Further, the average number of passengers getting out every time any of P1, P2, and P3 are stopped is P/S, so that

[Expression 10]

total value of getting-off time periods (10)

$$t_{off-all} = P\left(3 - \frac{3S}{N} + \frac{S^2}{N^2}\right) \times t_{off}$$

Furthermore, the total value of getting-on time periods and others will be expressed as follows:

[Expression 11]

total value of getting-on time periods=$P \times t_{on}$ total value of door-opening/closing time periods=$(S_t+1)(t_o+t_c)$ (11)

total value of running time periods=$(S_t+1)(t_f(3)-t_v(3))+2H \times t_v(3)$

Where: $t_f(3)$ is a running time period per 3 floors, and $t_v(3)$ is a passing time period per 3 floors.

When each value is calculated as described above, one going-round time period of TD $RTT_{TD}$ will be calculated with the following expression as the total sum of these values.

[Expression 12]

$$RTT_{TD}=P \times t_{on}+t_{off-all}+(S(3-3S/N+(S/N)^2)+1)(t_o+t_c+t_f(3)-t_v(3))+H \times t_v(3) \qquad (12)$$

Furthermore, with this value, the transportation capacity per unit time of one TD (the number of persons capable of being transported per unit time) $HC_{TD}$ will be obtained with the following expression.

[Expression 13]

$$HC_{TD}=300 \times 3P/RTT \qquad (13)$$

Heretofore, the expressions of traffic calculation of TD to which the invention is applied are described.

Now, the arrangement and operation according to the first embodiment of the invention is described.

FIG. 2 is a block diagram showing the entire arrangement example of the equipment planning support system for the triple-deck elevator according to the first embodiment of the invention.

With reference to FIG. 2, reference numeral 1 designates a triple-deck elevator equipment planning support system that derives the equipment draft plan of, e.g., the suitable cage specification and number of elevators with respect to the triple-deck elevator system. Numeral 2 designates a human I/F for inputting necessary data as well as outputting results to and from the triple-deck elevator equipment planning support system 1. Specifically, it is preferable that the triple-deck elevator equipment planning support system 1 is formed of a dedicated substrate having been manufactured, and it is perfectly all right to be a general-purpose computer such as personal computers. Further, the human I/F 2 is configured of, e.g., a display or a keyboard.

In addition, the triple-deck elevator equipment planning support system 1 is formed of: a standard database 1A in which data regarding the standard triple-deck elevator specification is stored; a cage data setting means 1B for setting a specific cage specification from the standard database 1A; transportation capacity calculation means 1C for calculating the practical transportation capacity per elevator on the basis of the building and cage specification data 1E having been set; and optimum draft plan deriving means 1D that compares the required transportation capacity having been inputted from the human I/F 2 and the transportation capacity per elevator having been calculated by transportation capacity calculation means 1C, and that derives the optimum number of elevators. These respective means are configured of software on the above-mentioned MPU or on the computer.

Furthermore, the above-mentioned transportation capacity calculation means 1C further consists of: average stop number calculation means 1C1 for calculating the average number of times of being stopped per going-round on the basis of set data of the building specification and cage specification data; getting-on/off time calculation means 1C2 for calculating the total value of getting-on/off time periods of passengers; door-opening/closing time calculation means 1C3 for calculating the total value of door-opening/closing time periods; running time calculation means 1C4 for calculating the total value of running time periods; going-round time calculation means 1C5 for calculating a going-round time period of an elevator from the calculation results of each of these means; and practical transportation capacity calculation means 1C6 for calculating the practical transportation capacity per triple-deck elevator based on the calculation result of mentioned going-round time calculation means 1C5.

Now, the operation according to the first embodiment of the invention is described referring to FIG. 3. FIG. 3 is a flowchart showing the schematic operation according to the first embodiment.

First, in Step S101, building specification data are inputted through the human I/F 2 of FIG. 2. Herein, the building specification data include building type, the number of building stories, service floors, story height, each floor resident population, each cage reference floor, and the like.

Subsequently, in Step S102, cage data setting means 1B sets cage data in accordance with the building specification having been inputted. For this setting, a method of preliminarily storing data regarding the standard cage specification in the standard database 1A is employed.

On the supposition of establishing as a rule such that the uppermost floor of a building to be serviced is, for example, not less than the 11th floor and not more than the 15th floor, the velocity will be 150 m/min; and that it is not less than the 16th floor and not more than the 20th floor, the velocity will be 180 m/min, it is possible to set easily the velocity specification of cages.

Furthermore, when the velocity is determined, it is possible to determine the standard acceleration, rate of acceleration, capacity, door width, and the like on the basis of the foregoing velocity. Moreover, in the case of incapable of being determined as having no alternative or in the case where a user intends to originally set the cage specification, the method of determining the specification data in the interactive mode through the human I/F 2 may be adopted.

When the cage and building specifications are determined in the procedure until Step S102, in Step S103, average stop number calculation means 1C1 makes the calculation of the predicted number of times of being stopped, being the average number of times of being stopped in one going-round in accordance with the mentioned Expression (9).

Subsequently, in Step S104, getting-on/off time calculation means 1C2 makes the calculation of a total value of getting-off time periods of passengers in accordance with the mentioned Expression (10). In Step S105, getting-on/off time calculation means 1C2, door-opening/closing time calculation means 1C3, and running time calculation means 1C4 make the calculations of each of the total values of a getting-on/off time period, a door-opening/closing time period, and a running time period in accordance with Expressions (11) respectively. Next, in Steps S106 and S107, going-round time calculation means 1C5 and transportation capacity calculation means 1C6 make the calculations of a going-round time period of the elevator, and a transportation capacity per elevator in accordance with the mentioned Expressions (12) and (13) respectively.

When the transportation capacity is calculated as described above, in Step S107, optimum draft plan deriving means 1D compares the traffic demand that will be generated in the building and the mentioned transportation capacity per elevator having been calculated to calculate the required number of elevators (Step S108), and outputs it as the optimum draft in Step S110.

Herein, the computation of the required number in Step S108 will be calculated with the following expression:

Required number=5 minute traffic demand/5 minute transportation capacity per elevator.

Further, the 5-minute traffic demand in the above expression will be calculated, for example, with the following table from the type of building and the resident population having been inputted in Step S101.

one company exclusive-use office building: 20% of resident population semi-exclusive-use office building: 16% of resident population multi-tenant building: 11% of resident population Whereas, it is preferable to directly set this 5-minute traffic demand in the interactive mode through the human I/F 2.

As described above, according to the invention, on the basis of a given building specification and cage specification data, the average number of times of being stopped per going-round is calculated; the total value of getting-on/off time periods of passengers is calculated based on the mentioned average number of times of being stopped having been calculated, the total value of door-opening/closing time periods and the total value of running time periods are likewise calculated; a going-round time period of an elevator is calculated from these calculation results; and a practical transportation capacity per on triple-deck elevator is calculated based on these calculation results. As a result, it comes to be possible to make the calculation of a transportation capacity regarding the triple-deck elevator system, and to carry out the equipment planning based thereon that cannot be conventionally achieved.

DESCRIPTION OF NUMERALS

Figure 1:
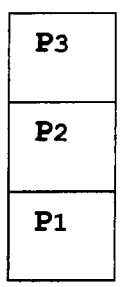
FIG. 1 are diagrams for explaining a part of the concept of traffic calculation of TD.
Figure 1:
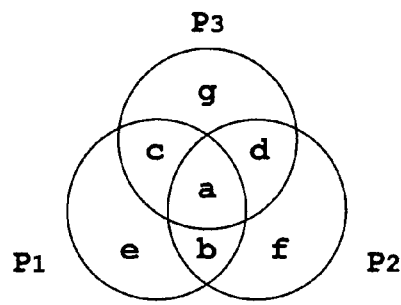
Figure 2:
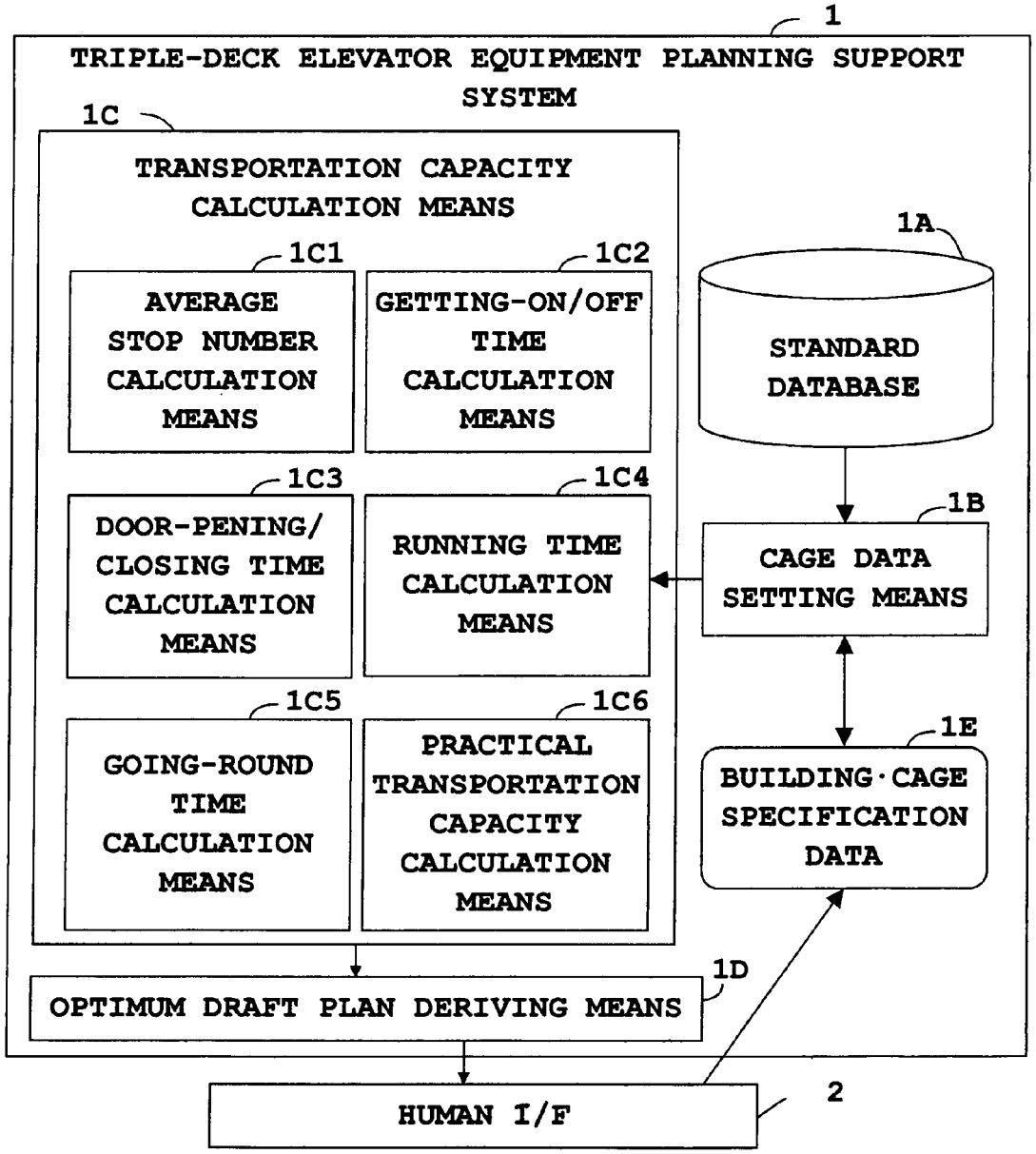
FIG. 2 is a block diagram showing an example of the entire arrangement of a triple-deck elevator equipment planning support system according to a preferred embodiment of the present invention.
Figure 3:
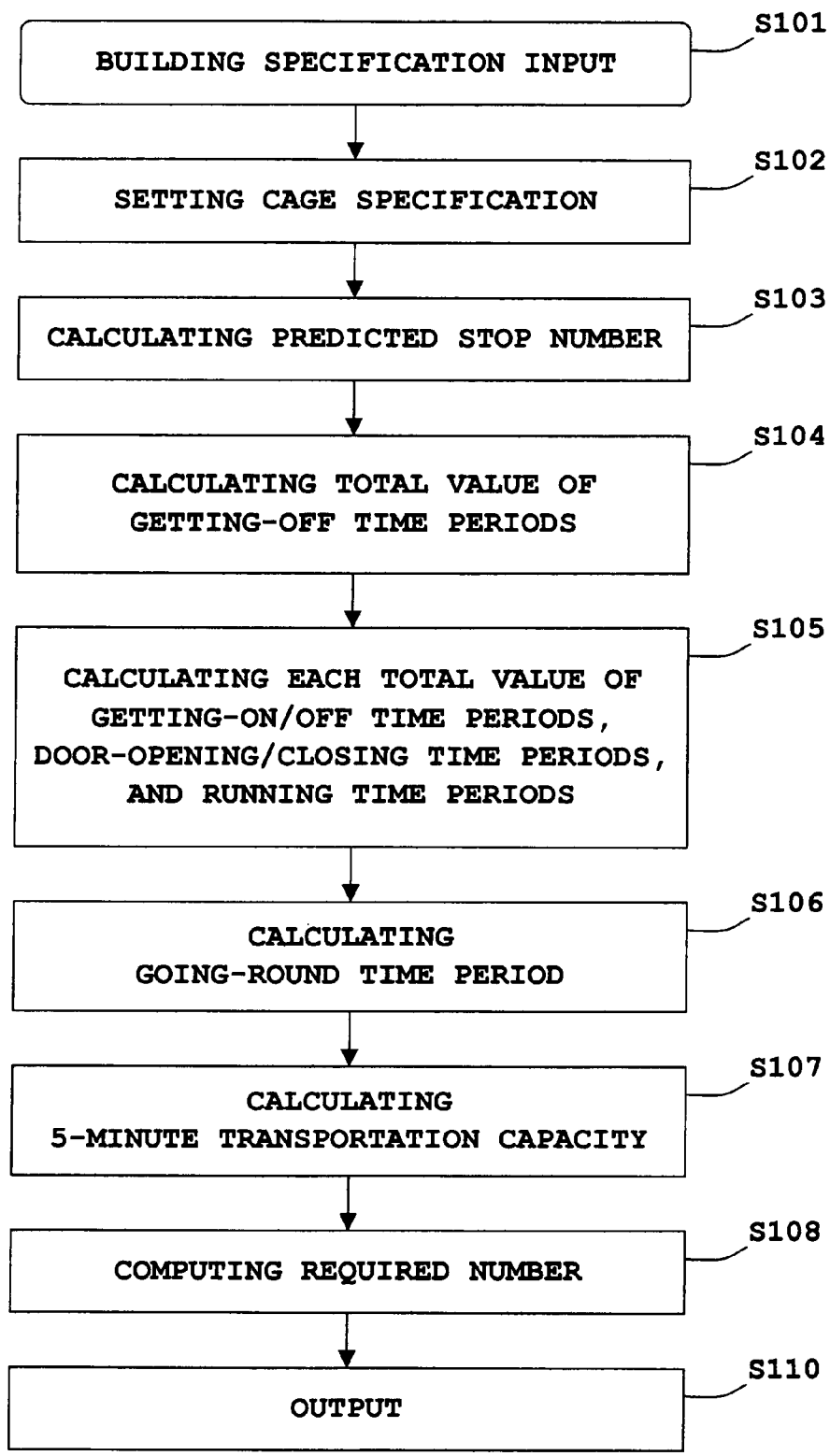
FIG. 3 is a flowchart showing the schematic operation according to the embodiment of the invention.

1: triple-deck elevator equipment planning support system,
2: human I/F,
1A: standard database,
1B: cage data setting means,
10: transportation capacity calculation means,
1C1: average stop number calculation means,
1C2: getting-on/off time calculation means,
1C3: door-opening/closing time calculation means,
1C4: running time calculation means,
1C5: going-round time calculation means,
1C6: practical transportation capacity calculation means, and
1D: optimum draft plan deriving means

The invention claimed is:

1. An equipment planning support system for a triple-deck elevator comprising transportation capacity calculation means that includes:

a computer that is configured to implement the following calculators:

an average stop number calculator for calculating the average number of times of being stopped per going-round on the basis of a given building specification and cage specification data with respect to a triple-deck elevator system;

a getting-on/off time calculator for calculating the total value of getting-on/off time periods of passengers based on the calculation result of said average stop number calculator;

a door-opening/closing time calculator for calculating the total value of door-opening/closing time periods;

a running time calculator for calculating a total value of running time periods;

a going-round time calculator for calculating a going-round time period RTT of the elevator from the calculation result of each of said calculators;

a practical transportation capacity calculator for calculating a practical transportation capacity HC per triple-deck elevator based on the calculation result of said going-round time calculator, according to the following formula:

$HC=300\times 3P/RTT$ where P is the number of passengers in a cage at a time of starting from a reference floor;

and an optimum draft plan deriving device that calculates the required number of elevators on the basis of the calculation result of said transportation capacity calculator and the traffic demand to be generated in a building, and outputs an optimum draft plan.

2. The equipment planning support system for the triple-deck elevator according to claim 1, further comprising a standard database in which data regarding the standard triple-deck elevator specification is stored, and data setting means for setting cage data on the basis of the building specification and the cage specification.

3. The equipment planning support system for the triple-deck elevator according to claim 1, wherein the average stop number calculator calculates, for a projected triple deck elevator, a probability based prediction of door-openings for one, two and three decks of the elevator.

* * * * *